(12) United States Patent
Matsushita et al.

(10) Patent No.: US 11,127,141 B2
(45) Date of Patent: Sep. 21, 2021

(54) IMAGE PROCESSING APPARATUS, IMAGE PROCESSING METHOD, AND A NON-TRANSITORY COMPUTER READABLE STORAGE MEDIUM

(71) Applicant: CANON KABUSHIKI KAISHA, Tokyo (JP)

(72) Inventors: Akihiro Matsushita, Tokyo (JP); Kiwamu Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/668,387

(22) Filed: Oct. 30, 2019

(65) Prior Publication Data
US 2020/0167933 A1    May 28, 2020

(30) Foreign Application Priority Data
Nov. 27, 2018    (JP) .............................. JP2018-221346

(51) Int. Cl.
*G06T 7/194*    (2017.01)
*H04N 5/247*    (2006.01)
*H04N 13/111*    (2018.01)
*G06T 7/136*    (2017.01)

(52) U.S. Cl.
CPC .............. *G06T 7/194* (2017.01); *G06T 7/136* (2017.01); *H04N 5/247* (2013.01); *H04N 13/111* (2018.05)

(58) Field of Classification Search
CPC ....... G06T 7/136; G06T 7/194; H04N 13/111; H04N 13/117; H04N 5/247
See application file for complete search history.

(56) References Cited

U.S. PATENT DOCUMENTS

| | | | | |
|---|---|---|---|---|
| 5,748,775 | A * | 5/1998 | Tsuchikawa | ....... G06K 9/00369 375/E7.083 |
| 6,721,461 | B1* | 4/2004 | Nichani | ................... G06K 9/38 382/145 |
| 8,867,834 | B2 | 10/2014 | Fujisaki | |
| 2010/0027842 | A1* | 2/2010 | Guo | ........................ G06T 7/136 382/103 |
| 2013/0016097 | A1* | 1/2013 | Coene | ..................... G06T 7/194 345/419 |
| 2014/0071241 | A1* | 3/2014 | Yang | ........................ G06T 7/50 348/46 |
| 2017/0085750 | A1* | 3/2017 | Katsuyama | .............. H04N 1/52 |

FOREIGN PATENT DOCUMENTS

JP    2013186817 A    9/2013

* cited by examiner

*Primary Examiner* — James T Boylan
(74) *Attorney, Agent, or Firm* — Rossi, Kimms & McDowell LLP

(57) ABSTRACT

An image processing apparatus generates an image indicating a foreground area of a captured image, based on (i) a threshold value corresponding to both luminance difference between the captured image and a background image and luminance of one of the captured image and the background image, (ii) obtained luminance of one of the captured image and the background image, and (iii) obtained luminance difference between the captured image and the background image.

17 Claims, 9 Drawing Sheets

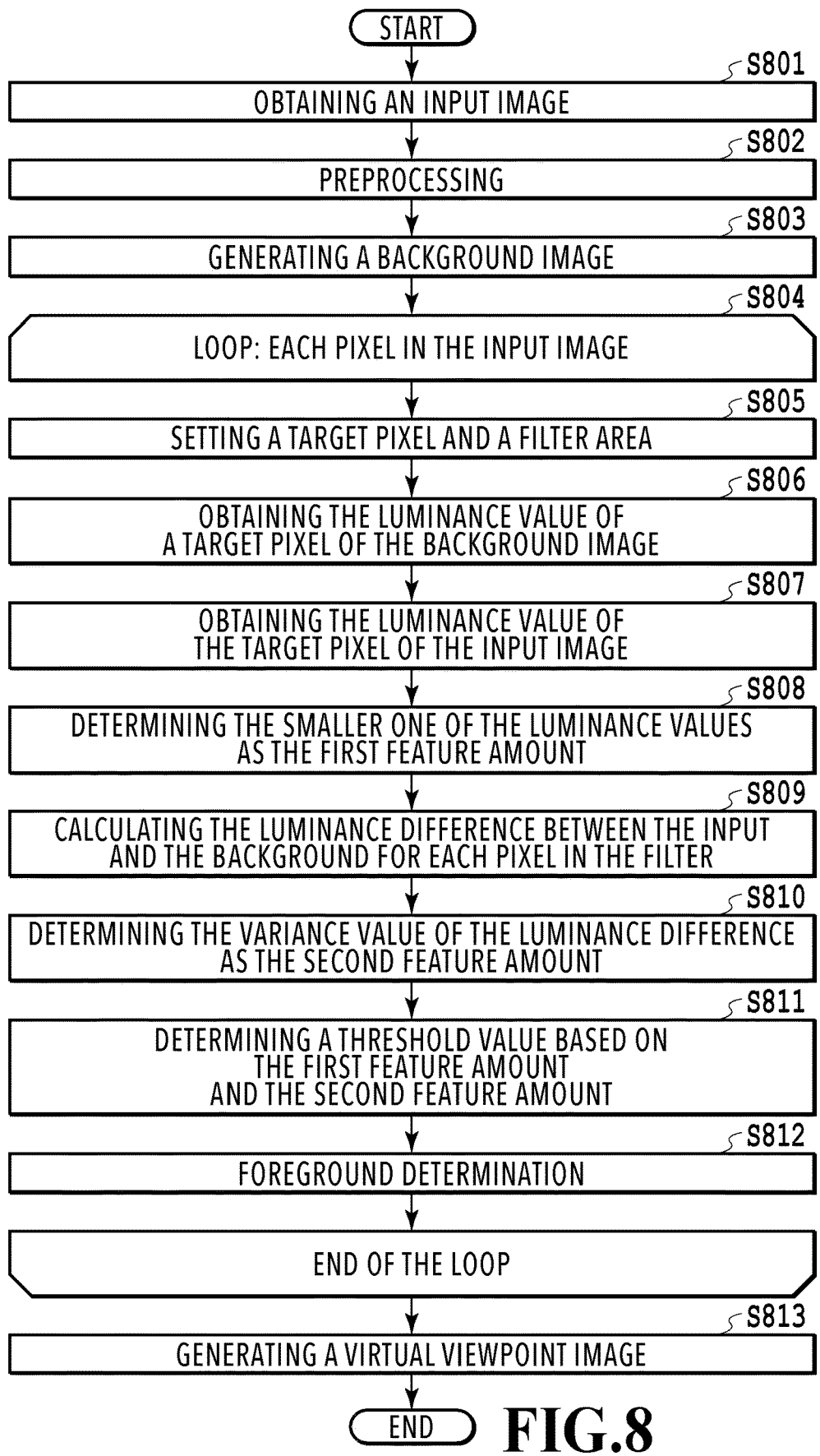

IMAGE PROCESSING APPARATUS, IMAGE PROCESSING METHOD, AND A NON-TRANSITORY COMPUTER READABLE STORAGE MEDIUM

BACKGROUND

Technical Field

The present disclosure relates to a technology for generating an image indicating a foreground area.

Description of the Related Art

Processing for segmenting a foreground from a background part is performed on an image obtained by receiving an image captured by an image capturing device. Background subtraction method is generally known as a method for segmenting a foreground of an input image from a background part. Background subtraction method is a process of: calculating difference between a background image corresponding to an input image and the input image including a foreground; and regarding an area made by a collection of pixels, each of which is determined to have a difference larger than a predetermined value, as an area of a foreground.

Japanese Patent Laid-Open No. 2013-186817 discloses a technology in which a pixel value for determining an area of a foreground is changed for each pixel. Specifically, Japanese Patent Laid-Open No. 2013-186817 discloses a method of calculating a threshold value for determining an area of a foreground, based on a single feature amount, that is, a variance of the pixel values of pixels.

However, in such a case of determining a foreground area based on a single feature amount as in Japanese Patent Laid-Open No. 2013-186817, there is a possibility that a foreground area cannot be determined appropriately. For example, in determination of a foreground by background subtraction method, in a case where a difference (luminance difference) between a luminance value of an input image and a luminance value of a background image is larger than a threshold value, it may be determined as a foreground. In this determination method, in a case where a luminance difference of a pixel is equal to or smaller than the threshold value, the pixel is not determined to be a pixel constituting a foreground even though the pixel is a pixel constituting a foreground of an input image.

On the other hand, there is a blur area at a boundary part between a foreground and a background of an input image due to a lens blur, an aberration, or the like, and the blur area is an area in which luminance difference from the background image is small. Therefore, in a case where the threshold value is simply reduced, the pixels constituting the blur area may be determined as the pixels constituting the foreground area even though the pixels constituting the blur area should not be determined as the foreground area.

In a case where an image indicating a foreground area is generated based on such determination as described above, there is a possibility that the image indicating the foreground area cannot be generated with high accuracy.

SUMMARY OF THE DISCLOSURE

An image processing apparatus according to the present disclosure includes: a first obtaining unit configured to obtain a captured image and a background image corresponding to the captured image; a second obtaining unit configured to obtain luminance of at least one of the captured image and the background image obtained by the first obtaining unit and a luminance difference between the captured image and the background image obtained by the first obtaining unit; and a generating unit configured to generate an image indicating a foreground area of the captured image, based on (i) a threshold value corresponding to luminance difference between the captured image and the background image and luminance of one of the captured image and the background image, (ii) the luminance obtained by the second obtaining unit, and (iii) the luminance difference obtained by the second obtaining unit.

Further features of the present invention will become apparent from the following description of exemplary embodiments with reference to the attached drawings.

BRIEF DESCRIPTION OF THE DRAWINGS

FIG. 8 is a flowchart illustrating processing for determining a foreground area.

DESCRIPTION OF THE EMBODIMENTS

Hereinafter, the present disclosure is explained in detail based on some embodiment examples with reference to the accompanying drawings. Note that the configurations illustrated in the following embodiments are merely examples and the present disclosure is not limited to the illustrated configurations.

First Embodiment

In the present embodiment, an explanation is given of a mode in which a foreground area, which is used for generating a virtual viewpoint image, is generated. Therefore, an outline of a virtual viewpoint image is briefly explained. There is a technology in which multiple cameras are installed at different positions to capture images from multiple viewpoints in a synchronized manner, so as to generate a virtual viewpoint image by use of the multi-viewpoint images obtained by the image capturing. According to the technology of generating a virtual viewpoint image from such multi-viewpoint images as described above, highlight scenes of a soccer game, a basketball game, or the like, can be viewed/browsed from various angles, for example, so that it is possible to give a user a highly realistic feeling, compared to normal images. Generation of a virtual viewpoint image based on multi-viewpoint images is performed by collecting image data of images captured by multiple cameras into a server that performs image processing and by performing a process such as rendering.

Various methods have been developed for the technology of generating a virtual viewpoint image. For example, there is processing of segmenting a foreground, which is a main object, from images captured by multiple cameras and rendering three-dimensional model data that has been created from image data of the foreground. Creation of a three-dimensional model of a foreground requires information indicating the silhouettes of the foregrounds (foreground area) viewed from multiple cameras.

Here, an explanation is given of background subtraction method, which is one of the methods of processing for segmenting a foreground from a background part in order to generate an image indicating a foreground area. Background subtraction method is a method of: calculating difference between luminance values (luminance difference) of a background image and an input image including a foreground; and determining an area made of a collection of pixels, each of which is determined to have a luminance difference larger than a threshold value, as a foreground area of the input image.

Figure 1A:
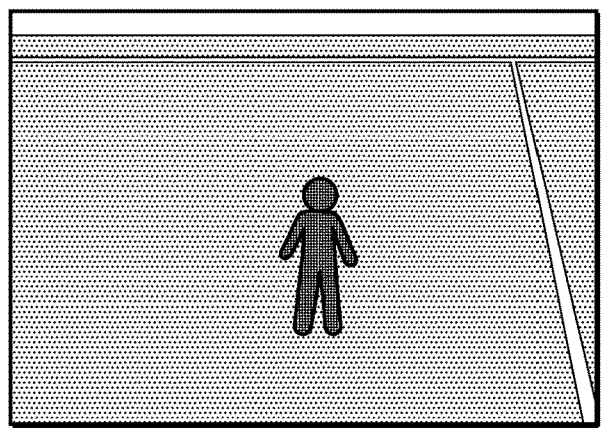
FIG. 1A is a figure illustrating processing for determining a foreground area from an input image.
Figure 1B:
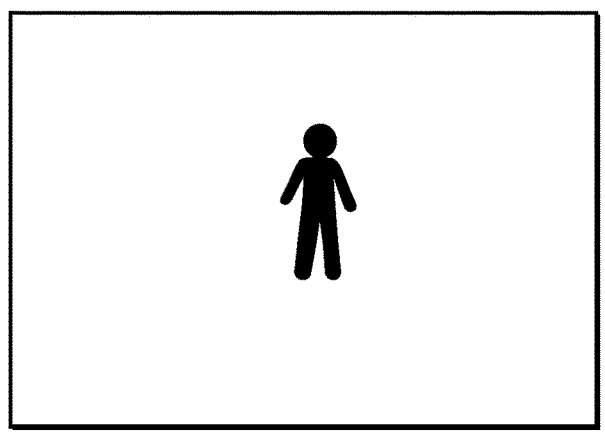
FIG. 1B is a figure illustrating processing for determining a foreground area from an input image.

For example, FIG. 1A is an example of an input image received by an image processing apparatus that generates a foreground area. In FIG. 1A, there are a field, which is a background, and a human figure, which is a foreground of the input image, inside the field. FIG. 1B is an image indicating the foreground area of the input image in FIG. 1A. By background subtraction method, luminance difference for each pixel in the input image and the background image which corresponds to the input image, is calculated. A collection of pixels, each of which the calculated luminance difference is larger than a threshold value, is segmented as a foreground area, and, thereby, an image indicating the foreground area of the input image is generated as illustrated in FIG. 1B. The image indicating the foreground area is represented as a binary image, of which each pixel is in a black color area or in a white color area as illustrated in FIG. 1B. In FIG. 1B, the black color area indicates the area determined to be the foreground area.

In order to generate a high-definition virtual viewpoint image, it is required that the shape of a foreground area accurately indicates the silhouette of the foreground as illustrated in FIG. 1B. However, there are several problems in obtaining an accurate shape of a foreground area.

Figure 1C:
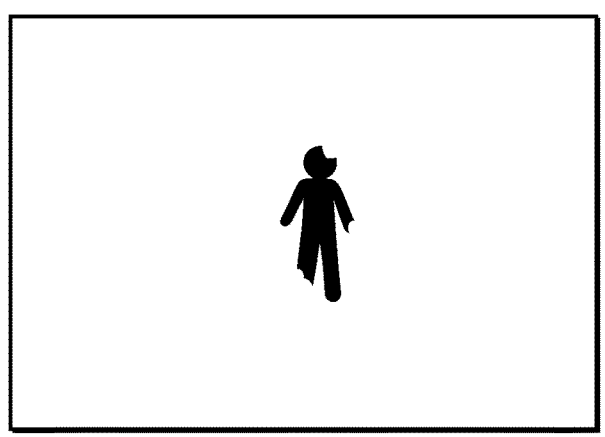
FIG. 1C is a figure illustrating processing for determining a foreground area from an input image.

Of the pixels indicating a foreground of an input image, there may be pixels having a small luminance difference from the background image. Such a pixel having a small luminance difference is not determined to be a pixel of the foreground because the luminance difference is not larger than a threshold value even though the pixel is actually a pixel indicating the foreground. FIG. 1C is a figure illustrating the foreground area in a case where a part of the pixels indicating the foreground of the input image is not determined to be the foreground. It can be seen that the foreground area in FIG. 1C has defects in some portions that are actually the foreground area, compared to the foreground area in FIG. 1B.

Therefore, it is conceivable to eliminate occurrence of defects in the foreground area by reducing the threshold value for determining the foreground area, so that, among the pixels indicating the foreground of the input image, the pixels having a small luminance difference from the background image are also determined to be the pixels of the foreground.

Figure 1D:
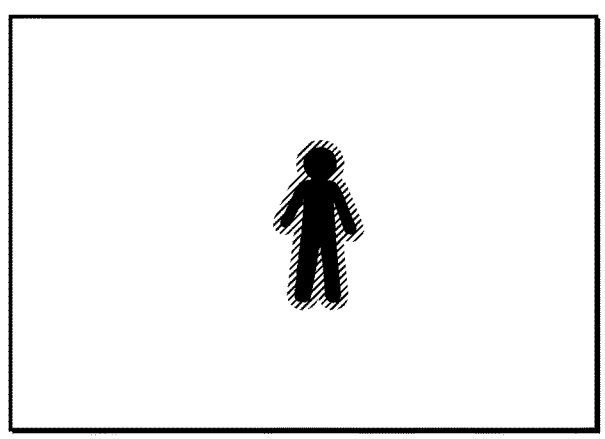
FIG. 1D is a figure illustrating processing for determining a foreground area from an input image.

However, for example, at a boundary part between a background and a foreground in an input image, there is a blur area in which pixel values of the foreground and the background are mixed due to a lens blur, an aberration, a motion blur, or the like. A blur area is an area that is not the foreground, but there is a luminance difference from the background image, although the luminance difference thereof is smaller than the luminance difference between the foreground and the background image. For this reason, in a case where the threshold value is reduced, the blur area is also determined to be the foreground area, which may cause the foreground area to become enlarged as illustrated in FIG. 1D (the hatched part in FIG. 1D shows enlarged area of the foreground area).

As described above, in such a case where the threshold value is constant, there is a possibility of occurrence of a defect or a bulge in the shape of a foreground area, which may lead to a reduction in the quality of a virtual viewpoint image. For this reason, the present embodiment is a mode in which two feature amounts are calculated from information of an input image and a background image in order to determine a threshold value, and the threshold value for determining a foreground area is determined for each pixel, based on the two feature amounts.

[System Configuration]

Figure 2:
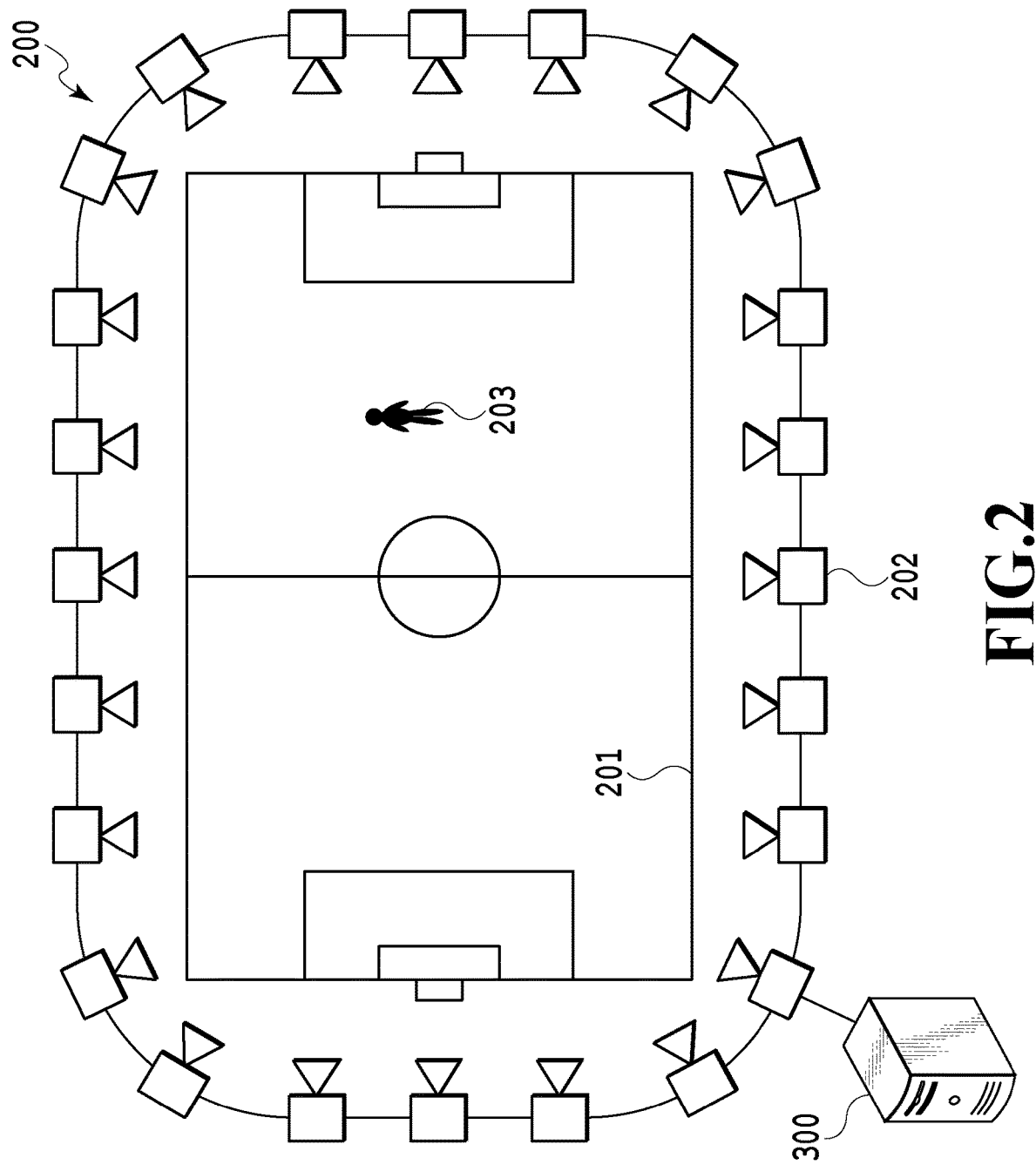
FIG. 2 is a figure illustrating a virtual viewpoint system.

FIG. 2 is a figure for explaining a schematic configuration of a system 200 of the present embodiment. Multiple cameras 202, which are image capturing devices, are arranged side by side around the stadium, and the field 201 of the stadium is configured to be imaged by the multiple cameras 202 from multiple viewpoints.

It is assumed that a game such as a soccer game is held in the field 201 and that a human FIG. 203 is present inside the field 201 as an object, which is to be a foreground of an input image. An object is a specific human figure such as a player, a manager, a referee, or the like. The object may be an object having a predetermined image pattern, such as a ball or a goal. Furthermore, the object may be a moving object or a stationary object.

Each camera 202 includes input/output hardware for data transmission. The cameras 202 are connected to each other in a ring shape by use of a network cable, or the like, and are configured to sequentially transmit images to an adjacent camera via the network. One of the cameras 202 is connected to an image processing apparatus 300. The image processing apparatus 300 performs processing for generating a virtual viewpoint image by use of image data obtained from each camera 202. Note that the virtual viewpoint image may be a moving image or a still image.

[Configuration of Image Processing Apparatus]

Figure 3A:
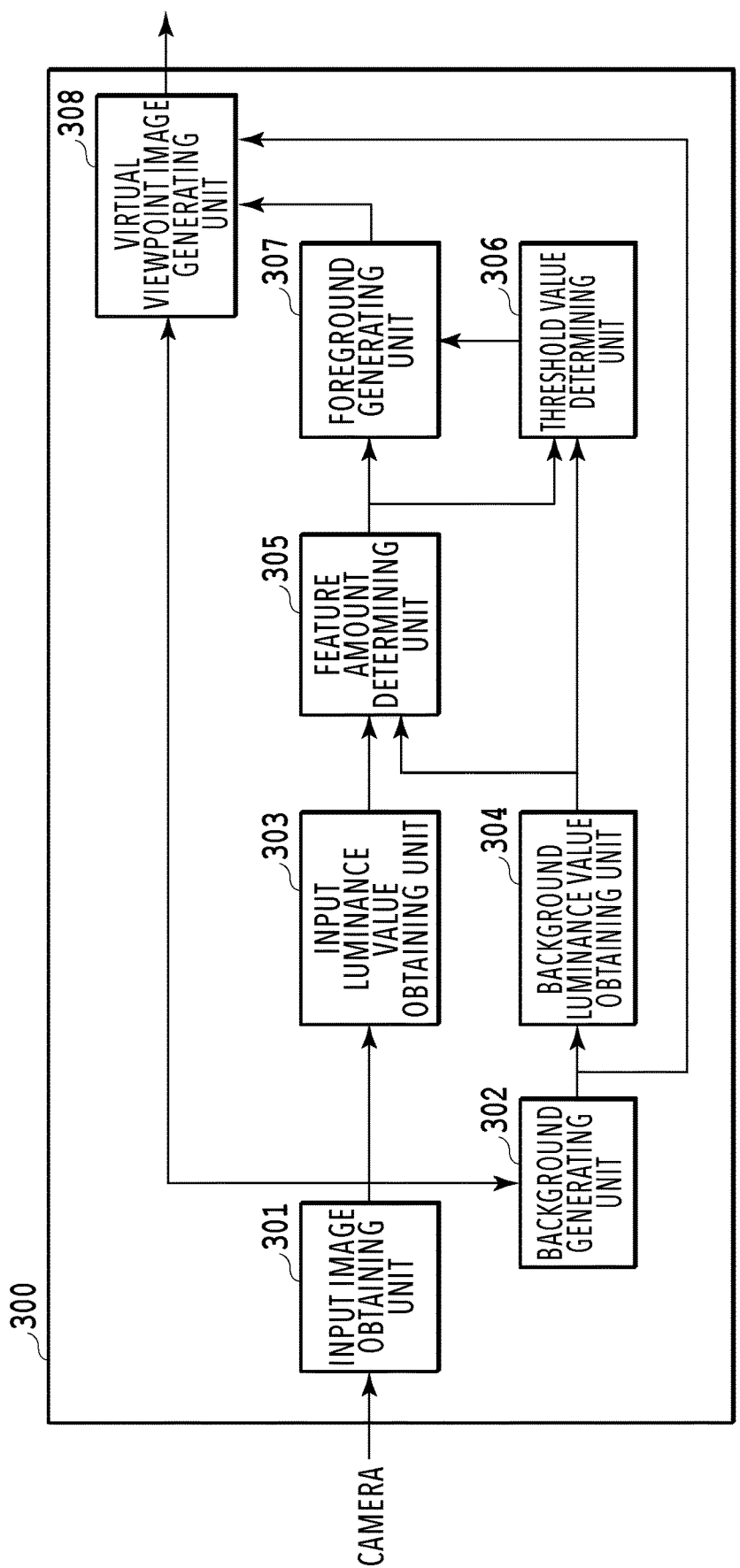
FIG. 3A is a block figure illustrating a functional configuration of an image processing apparatus.

FIG. 3A is a block figure illustrating an internal configuration of the image processing apparatus 300. The image processing apparatus 300 includes an input image obtaining unit 301, a background generating unit 302, an input luminance value obtaining unit 303, a background luminance value obtaining unit 304, a feature amount determining unit 305, a threshold value determining unit 306, a foreground generating unit 307, and a virtual viewpoint image generating unit 308.

The image processing apparatus 300 according to the present embodiment includes a built-in ASIC (application specific integrated circuit), an FPGA (field programmable gate array), or the like. Each module illustrated in FIG. 3A is mounted as hardware inside the ASIC or FPGA of the image processing apparatus 300.

Figure 3B:
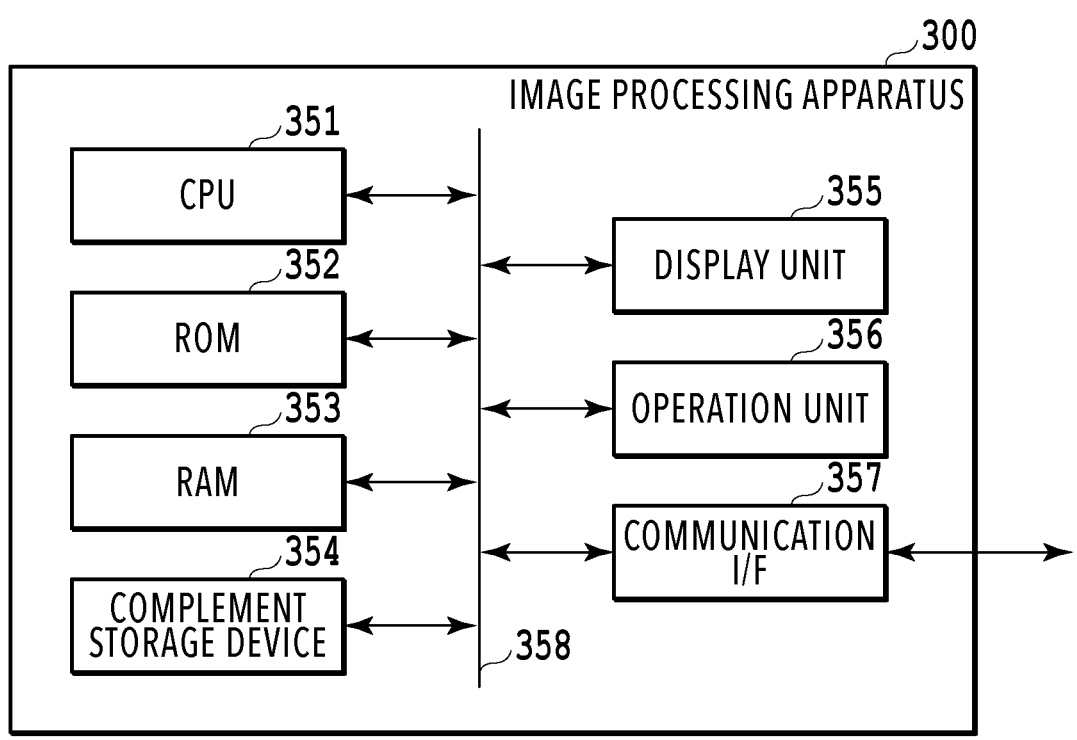
FIG. 3B is a figure illustrating a hardware configuration of the image processing apparatus.

The image processing apparatus 300 is configured as an image processing apparatus including a CPU, a RAM, a ROM, and a complement storage device (HDD). A hardware configuration of the image processing apparatus 300 is explained with reference to FIG. 3B. The image processing apparatus 300 includes a CPU 351, a ROM 352, a RAM 353, a complement storage device 354, a display unit 355, an operation unit 356, a communication I/F 357, and a bus 358.

The CPU 351 controls the entire image processing apparatus 300 by use of a computer program and data stored in the ROM 352 or RAM 353. Note that the image processing apparatus 300 may include one or more dedicated hardware other than the CPU 351, so that the dedicated hardware executes at least a part of the processing performed by the CPU 351. Examples of dedicated hardware include an ASIC, an FPGA, a DSP (digital signal processor), etc. The ROM 352 stores a program that need not be changed, etc. The RAM 353 temporarily stores data or a program supplied from the complement storage device 354, data supplied from the outside via the communication I/F 357, or the like. The complement storage device 354 is configured with, for example, a hard disk drive (HDD), etc., and stores various kinds of data such as image data and audio data.

The display unit 355 is configured with, for example, a liquid crystal display, an LED, or the like, and displays a GUI (Graphical User Interface), etc., for a user to operate the image processing apparatus 300. The operation unit 356 is configured with, for example, a keyboard, a mouse, a joystick, a touch-sensitive panel, or the like, and inputs various kinds of instructions to the CPU 351 in response to operations by a user.

The communication I/F 357 is used for communication with an external device of the image processing apparatus 300. For example, in a case where the image processing apparatus 300 is connected to an external device by wire, a cable for communication is connected to the communication I/F 357. In a case where the image processing apparatus 300 has a function of performing wireless communication with an external device, the communication I/F 357 includes an antenna. A bus 358 connects each unit of the image processing apparatus 300 and transmits information.

In the present embodiment, it is assumed that the display unit 355 and the operation unit 356 are present inside the image processing apparatus 300. However, at least one of the display unit 355 and the operation unit 356 may be present as a separate device outside the image processing apparatus 300. In this case, the CPU 351 may operate as a display control unit that controls the display unit 355 and as an operation control unit that controls the operation unit 356.

In this way, there may be a mode in which the CPU 351 reads out a program stored in the ROM 352, or the like, to the RAM 353 and executes the program, so as to cause each unit illustrated in FIG. 3A to function.

[Flowchart]

Figure 4:
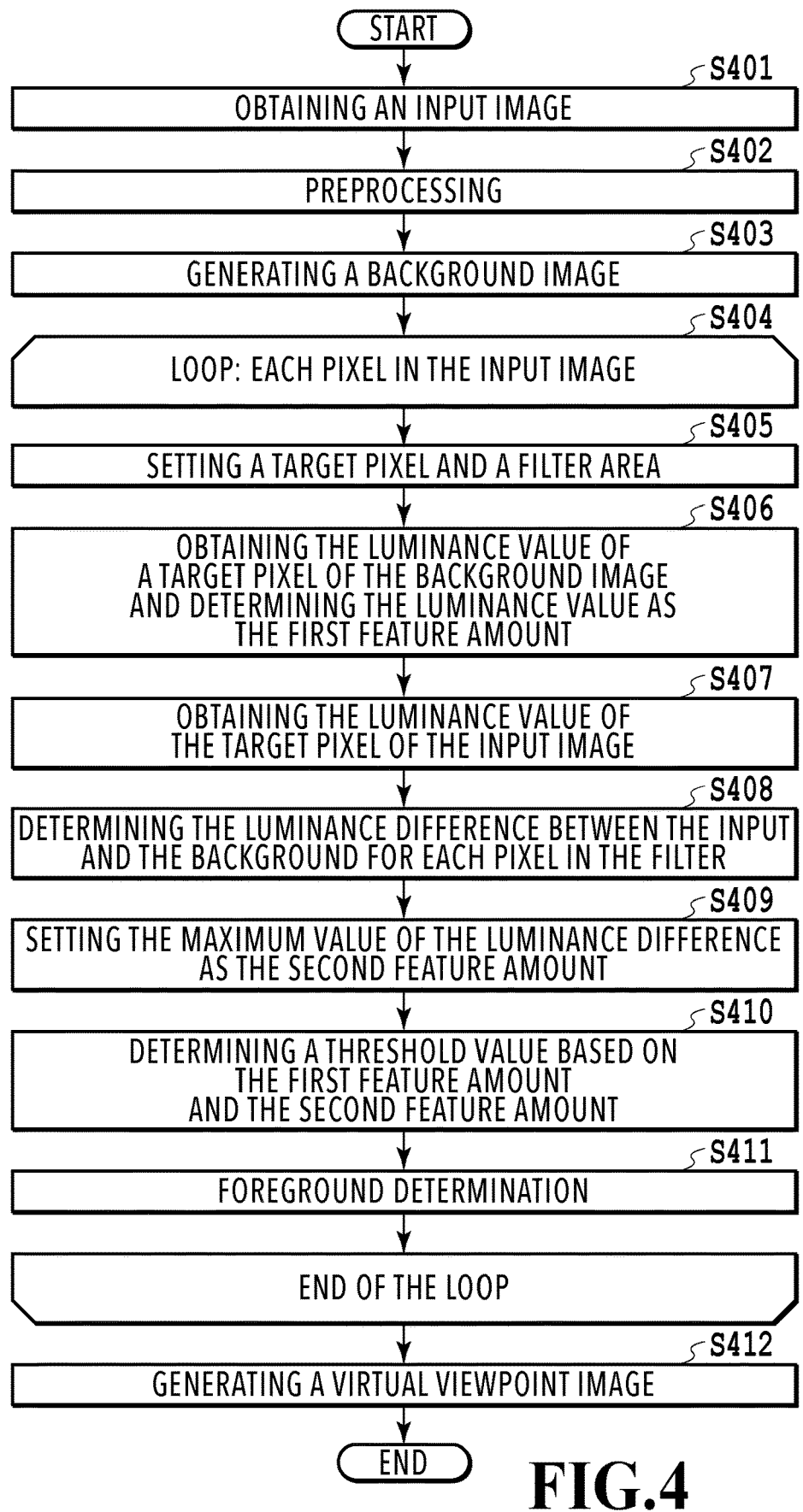
FIG. 4 is a flowchart illustrating processing for determining a foreground area.

FIG. 4 is a figure illustrating an example of a flowchart of the processing performed by the image processing apparatus 300. A part or all of the functions in the steps of FIG. 4 are implemented by hardware such as an ASIC, an FPGA, or an electronic circuit of the image processing apparatus 300. Alternatively, the series of processes illustrated in the flowchart of FIG. 4 may be performed by the CPU of the image processing apparatus 300 retrieving a program code stored in the complement storage device into the RAM and executing the program code. Note that the symbol "S" in the explanation of each process means that it is a step in the flowchart. Hereinafter, an outline of the processing by the image processing apparatus 300 is explained with reference to FIG. 4.

In S401, the input image obtaining unit 301 obtains image data, which is based on an image captured by each camera, from each camera 202 via a network. For ease of explanation below, an explanation is given of processing performed on image data based on an image captured by a certain camera among image data of respective cameras obtained by the input image obtaining unit 301. In reality, the following steps are performed for image data of each camera. Additionally, an image represented by image data obtained by the input image obtaining unit 301 is referred to as an input image. An input image is an image such as a still image or a frame image of a moving image.

In S402, the input image obtaining unit 301 performs preprocessing, such as image vibration correction, image distortion correction including lens distortion, or color and gamma adjustment, on the image data indicating the input image.

In S403, the background generating unit 302 obtains the image data of the input image from the input image obtaining unit 301. The background generating unit 302 generates a background image by use of the obtained image data. There is no limitation on the background image generation method by the background generating unit 302. For example, a publicly known method such as a background estimation method by use of Gaussian mixture model (GMM) may be applied. Gaussian mixture model is a generally well-known method, and, therefore, a detail explanation thereof is omitted. As a background image generation method, the background generating unit 302 may obtain a previously generated background image so as to generate a background image in such a manner as updating the previously generated background image based on image data of an input image. Furthermore, a background image that is generated by another device may be obtained and used for the subsequent processes.

A pixel to be a processing target is selected from the input image in S404 and the processes of S405 through S411 are performed repeatedly, so that the processes of S405 through S411 are performed for every pixel in the input image. That is, the pixel to be a processing target is selected from unprocessed pixels, and the processes of S405 through S411 are performed. When processing on the pixel of the processing target is terminated, another pixel to be a processing target is selected again from unprocessed pixels. Once there are no more unprocessed pixels, the processing proceeds to S412.

In S405, the input image obtaining unit 301 selects a target pixel, which is a pixel to be a processing target, from unprocessed pixels of the input image. The input image obtaining unit 301 transmits the pixel data in the filter area corresponding to the target pixel to the input luminance value obtaining unit 303.

The filter area is, for example, a rectangular area made of several pixels surrounding the target pixel as the center. The filter area is used to calculate a feature amount for determining a threshold value to be described later. The number of pixels constituting the filter area may be set in advance by a user. Alternatively, there may be a mode in which the number of pixels for determining the filter area is changed as needed according to information about image data of an input image.

In S406, the background luminance value obtaining unit 304 obtains, from the background generating unit 302, data of pixels in the area of the background image, which corresponds to the filter area of the target pixel. Of the obtained data, the background luminance value obtaining unit 304 transmits, to the feature amount determining unit 305, the luminance value of each pixel in the area of the background image, which corresponds to the filter area of the target pixel. The feature amount determining unit 305 determines the luminance value of the pixel in the background image that corresponds to the target pixel as the first feature amount of the target pixel. For example, in a case where information about each pixel of the image is configured with RGB values, the luminance value is a value calculated based on RGB values.

In S407, the input luminance value obtaining unit 303 obtains the image data of the input image and transmits the luminance value of each pixel in the filter area including the target pixel, based on the data of the filter area and the data of the target pixel in the input image, to the feature amount determining unit 305.

In the present embodiment, the first feature amount for determining a threshold value to be described later is explained as the luminance value of the background image corresponding to the target pixel. However, the luminance value of the target pixel in the input image obtained in S407 may be the first feature amount.

In S408, the feature amount determining unit 305 calculates difference between luminance values (luminance difference) for each pixel, regarding each pixel in the filter area of the input image transmitted in S407 and each pixel in the area of the background image corresponding to the filter area transmitted in S406.

In S409, the feature amount determining unit 305 determines the maximum value among the luminance differences calculated in S408 as the second feature amount of the target pixel.

In S410, the threshold value determining unit 306 obtains the first feature amount (background luminance value) determined in S406 and the second feature amount (maximum value of luminance differences) determined in S409. The threshold value determining unit 306 determines a threshold value for determining whether the target pixel is a pixel constituting the foreground area, according to the obtained first feature amount and second feature amount.

Figure 5:
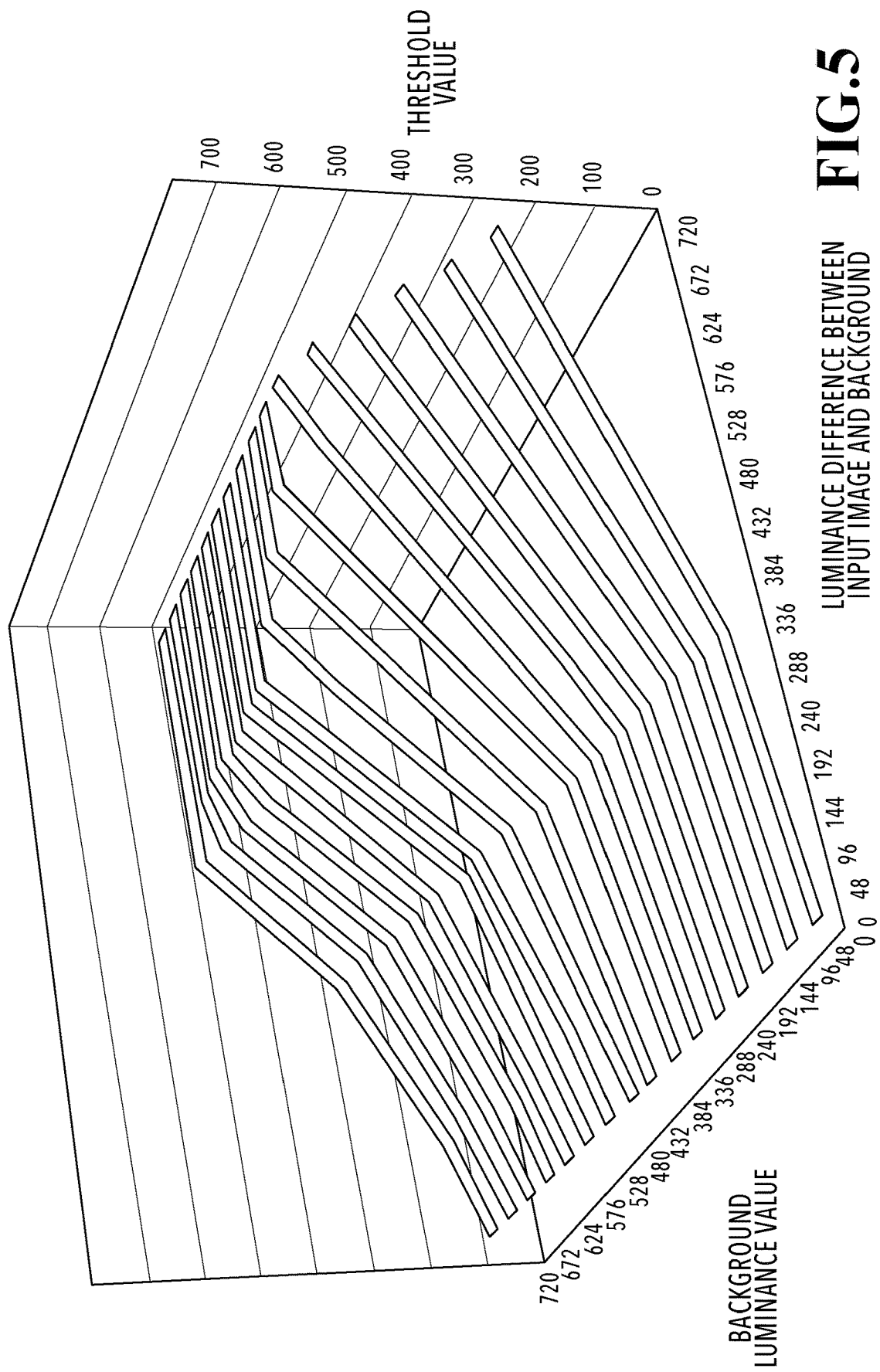
FIG. 5 is a figure illustrating a two-dimensional table.

The threshold value for determining the foreground area is defined by the first feature amount as one axis and by the second feature amount as the other axis. The threshold value is determined based on a table (two-dimensional table), in which the threshold value is decided when the two feature amounts, that is, the first feature amount and the second feature amount, are decided. FIG. 5 is a figure illustrating an example of the two-dimensional table as a graph. As illustrated in FIG. 5, the threshold value of the two-dimensional table is set so as to increase as the first feature amount (background luminance value) increases. The reason for this is explained with reference to FIG. 6A.

Figure 6A:
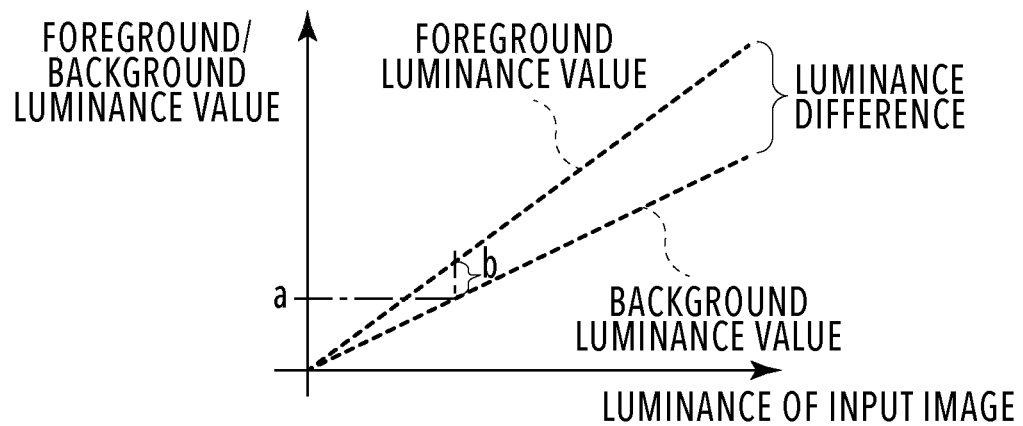
FIG. 6A is a figure illustrating a relationship between an input image and a background image.

FIG. 6A is a graph illustrating an example of the relationship between the luminance value of a pixel indicating a foreground and the luminance value of the corresponding pixel in a background image in a case of changing the luminance values in a predetermined input image. The horizontal axis of the graph in FIG. 6A indicates luminance values, and the vertical axis of the graph indicates luminance values of pixels indicating the foreground of the input image and luminance values of pixels of the background image. As illustrated in FIG. 6A, as the luminance value of a pixel in the background image increases, the luminance difference from the corresponding pixel of the foreground increases. Contrarily, in a case where the luminance value of a pixel in the background image is low, the luminance difference from the corresponding foreground becomes small.

Therefore, in a case where the luminance value of a pixel in the background image is smaller than "a" in FIG. 6A, the luminance difference between the pixel indicating the foreground of the input image and the pixel in the background image is smaller than "b" in FIG. 6A. Therefore, in a case where the threshold value for determining the foreground area is constant, luminance difference may not be larger than the threshold value. Thus, in the case where the threshold value is constant, a foreground of the input image may not be determined as the foreground area, which causes such defects in a foreground area as illustrated in FIG. 1C to occur in a generated image indicating the foreground area. For this reason, it is desirable to increase the threshold value according to how lame the luminance value of a pixel in the background image is.

Therefore, the threshold value is determined so as to increase as the background luminance value (first feature amount) increases. The same applies to a case in which the first feature amount is a luminance value of a target pixel in an input image. The degree of change of the threshold value corresponding to a luminance value of the background image is set in advance according to the gamma characteristic, or the like, of the background image.

Furthermore, as illustrated in FIG. 5, the threshold value of the two-dimensional table is set so as to increase as the second feature amount (the maximum value of luminance difference) increases. The reason for this is explained with reference to FIG. 6B.

Figure 6B:
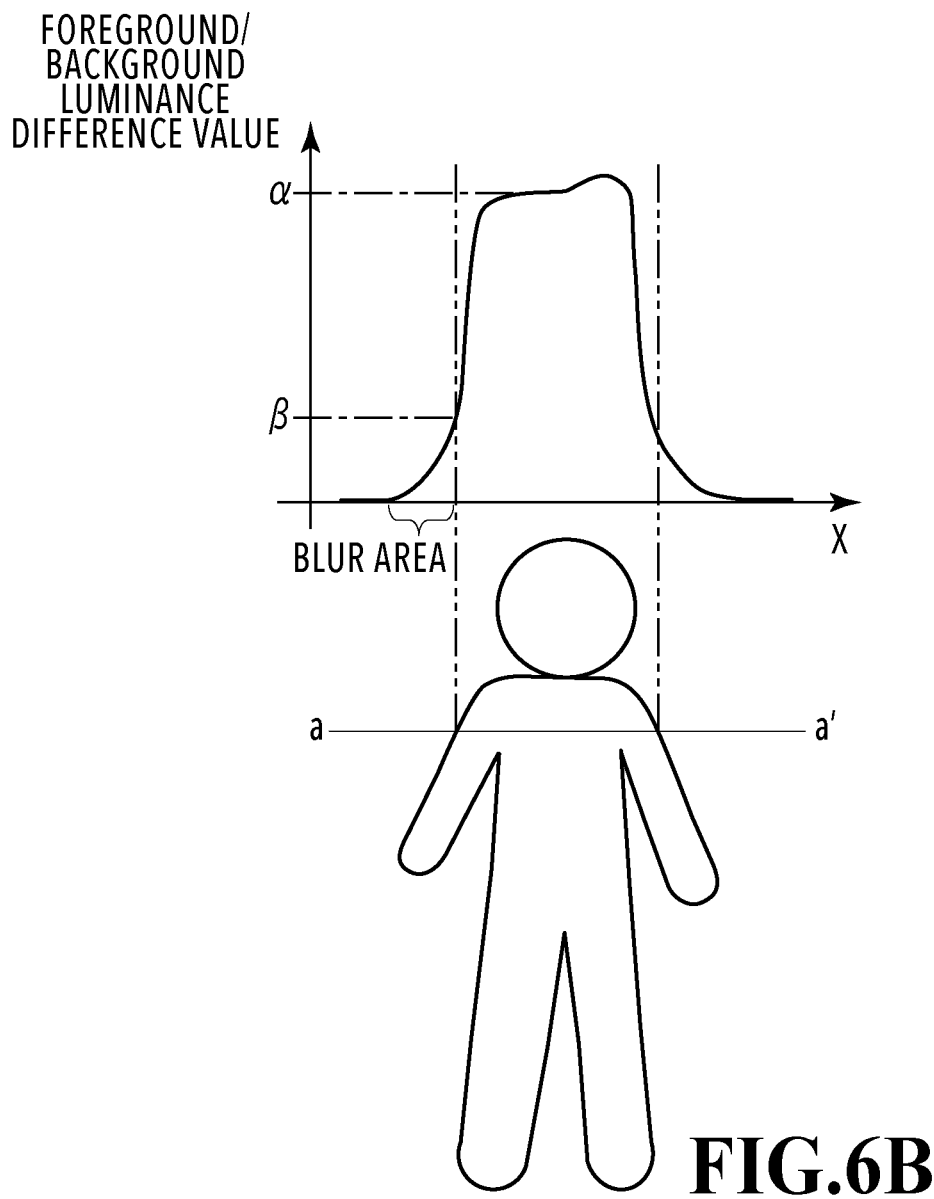
FIG. 6B is a figure illustrating a relationship between an input image and a background image.

The upper figure in FIG. 6B is a graph illustrating luminance difference between the input image and the background image, and the lower figure in FIG. 6B is the input image including the foreground (human figure) based on which the graph is created. The horizontal axis of the graph of FIG. 6B represents positions on the horizontal line from "a" to "a'" in the lower figure of FIG. 6B. The vertical axis of the graph in FIG. 6B represents luminance difference between a pixel of the input image on the line from "a" to "a'" in the input image and a pixel at the same position in the background image. Further, the curved line on the graph is made by connecting points plotted with values indicating the luminance difference at each position on the line from "a" to "a'".

The value of "α" in the graph of FIG. 6B is a value of a luminance difference between the foreground of the input image and the background image. The value of "β" in the graph of FIG. 6B is a value of a luminance difference from the background image in a blur area at the boundary part between the foreground of the input image and the background. The blur area is generated by mixing of pixel values of the foreground and the background due to a lens blur, an aberration, a motion blur, or the like. As indicated by the value of "β" in the graph of FIG. 6B, there is a luminance difference between the blur area of the input image and the background image, although the luminance difference is smaller than "α".

In general, the larger the luminance difference ("α" in FIG. 6B) between a pixel in a foreground and the corresponding pixel in a background image is, the larger the maximum value ("β" in FIG. 6B) of luminance difference in a blur area becomes. Thus, in a case where "α" is large, "β" also increases. Therefore, it is desirable to increase the threshold value according to how large "α" is, in order not to determine a blur area as a foreground area.

Since the blur area and the foreground of the input image are in proximity to each other, in a case where the target pixel is a pixel constituting the blur area, a pixel in the foreground is also included in the filter area of the target pixel. In this case, the maximum value of luminance difference in the filter area, which is to be the second feature amount, is a luminance difference between the foreground and the background ("α" in FIG. 6B). As illustrated in FIG. 5, the threshold value increases as the second feature amount, which is the maximum value of luminance difference in the filter area, increases. For this reason, in a case where the target pixel is a pixel in the blur area and the luminance difference in the blur area is large, the maximum value of luminance difference in the filter area, which is the second feature amount, also becomes large. Therefore, the threshold value is determined to be large.

It is conceivable that, in a case where the threshold value is simply determined based on a luminance value of a background image, the threshold value becomes small because the luminance value of the background image is small. In that case, a blur area of an input image may be determined as a foreground area because the blur area is an area having luminance difference from the background image although the luminance difference is smaller than luminance difference between the foreground of the input image and the background image. In this case, such a phenomenon as illustrated in FIG. 1D, in which the shape of the determined foreground area is widen up to the background part outside the foreground area and becomes enlarged, occurs.

For this reason, by determining the threshold value based on two feature amounts, even in a case where the background luminance value of a target pixel is small, it is possible to adjust the threshold value such that the threshold value becomes large in a case where there is a pixel having a large luminance difference between the input image and the background image near the target pixel. Therefore, since it is possible to inhibit the pixels in a blur area from being determined as a foreground area, it is possible to inhibit such a phenomenon as illustrated in FIG. 1D, in which the shape of the foreground area is widened up to the background part outside the foreground area and becomes enlarged, from occurring. Returning to FIG. 4, the explanation of the flowchart is continued.

In S411, the foreground generating unit 307 obtains the luminance difference of the target pixel calculated by the feature amount determining unit 305 and the threshold value determined by the threshold value determining unit 306. The foreground generating unit 307 determines that the target pixel is a pixel constituting the foreground area in a case where the luminance difference of the target pixel is larger than the threshold value.

By executing the above processing for every pixel in the input image, the foreground area of the input image is determined, and, based on the result thereof, the foreground generating unit 307 generates an image indicating the foreground area. Therefore, in the present embodiment, it is possible to generate an image in which such a defect in a foreground area as illustrated in FIG. 1C and such enlargement of a foreground area as illustrated in FIG. 1D are inhibited.

In S412, the virtual viewpoint image generating unit 308 obtains the input image, the image indicating the foreground area of the input image from each camera, which is generated by the foreground generating unit 307, and the background image. Further, the virtual viewpoint image generating unit 308 generates an image indicating a foreground texture based on the input image and the image indicating the foreground area. The foreground texture is, for example, color information such as R, G, and B of each pixel in the area corresponding to the foreground indicated by the foreground area.

The virtual viewpoint image generating unit 308 generates a virtual viewpoint image by use of the background image, the image indicating the foreground area, and the image indicating the foreground texture. Here, an explanation is given of an outline of generation processing of a virtual viewpoint image. The virtual viewpoint image generating unit 308 executes a three-dimensional shape estimation processing for each object present in a scene of a captured image by use of the obtained foreground area of each camera. As the estimation method, a publicly known method, such as Visual-hull method by use of a foreground area of each camera, may be applied. In this way, data (for example, polygon data or voxel data) representing the three-dimensional shape of an object is generated. Then, an image quality level for the virtual viewpoint image to be generated is set.

Further, parameters such as the position/orientation (virtual camera path) and a gazed point (virtual gazed point path) of a virtual camera in a subject time frame of a virtual viewpoint image are set based on user input. The virtual viewpoint image generating unit 308 generates a virtual viewpoint image according to the parameters of the virtual camera set by a user. It is possible to generate a virtual viewpoint image by use of three-dimensional shape data of an object obtained by shape estimation processing and by use of a computer graphics technology for an image viewed from the virtual camera that has been set. A publicly known technology may be applied to this generation processing as appropriate. However, since the generation processing is not the main point of the present embodiment, an explanation thereof is omitted.

The above is the content of the generation processing of a virtual viewpoint image according to the present embodiment. In a case of generating a virtual viewpoint image of a moving image, the process of each step described above is repeatedly performed on a per frame basis in order to generate a virtual viewpoint image for each frame.

As explained above, in the present embodiment, a feature amount based on an input image is additionally provided for determining a threshold value. Further, determination of a threshold value is performed every time an input image for determining a foreground area is obtained. Therefore, according to the present embodiment, since a threshold value also changes according to an input image, it is possible to increase the accuracy for determining a foreground area, compared to a case in which the threshold value is fixed.

Further, in the present embodiment, a threshold value for determining a foreground area is determined based on the first feature amount and the second feature amount. Even though the first feature amount is small, in a case where the second feature amount is a large value, the threshold value is adjusted to become larger, compared to the threshold value determined only based on the first feature amount. Therefore, according to the present embodiment, for segmenting a foreground area from an input image, it is possible to generate a foreground area such that a defect of the foreground area is inhibited and enlargement of the foreground area is inhibited as well.

Note that, although the second feature amount is determined after the first feature amount is determined in the above-described explanation, the order is not limited as such. Processing may be performed in the reverse order.

Further, determination of the first feature amount and determination of the second feature amount may be performed simultaneously.

Second Embodiment

In the first embodiment, an explanation has been given of a mode in which a threshold value is determined based on the first feature amount, which is a luminance value of a background image, and the second feature amount, which is the maximum value of difference between luminance values of an input pixel in a filter area and a background pixel. In the present embodiment, an explanation is given of a mode in which a threshold value is determined using another values as feature amounts.

As for the present embodiment, differences from the first embodiment are mainly explained. Not-specified parts have the same configuration and processing as those in the first embodiment. Since the system configuration is the same as that of the first embodiment, the explanation thereof is omitted.

Figure 7:
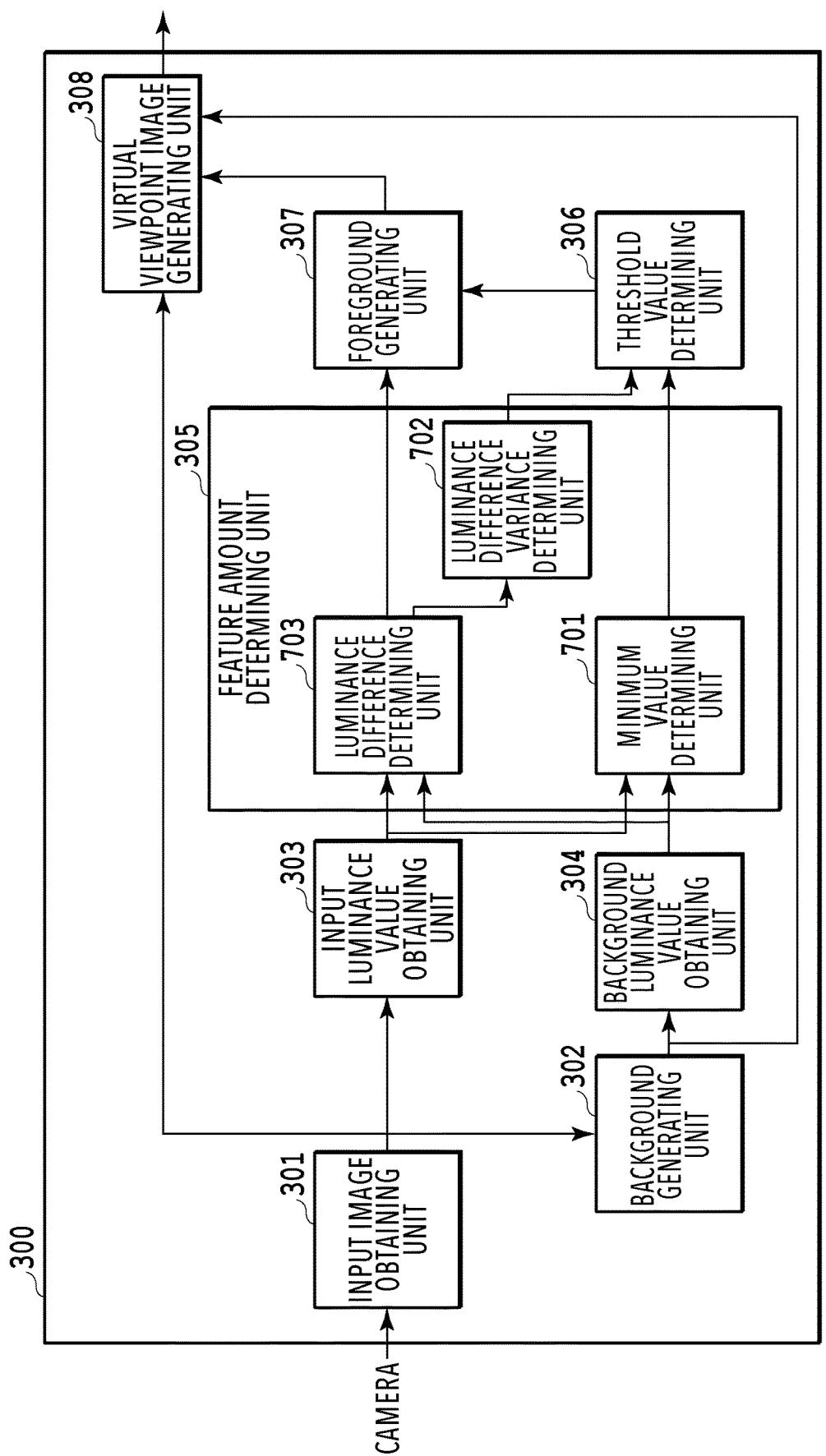
FIG. 7 is a block figure illustrating a functional configuration of an image processing apparatus.

FIG. 7 is a block figure illustrating an image processing apparatus 300 of the present embodiment. The feature amount determining unit 305 of the present embodiment includes a luminance difference determining unit 703, a minimum value determining unit 701, and a luminance difference variance determining unit 702. The functions other than the feature amount determining unit 305 are the same as those in the first embodiment.

[Flowchart]

FIG. 8 is a figure illustrating an example of a flowchart performed by the image processing apparatus 300 of the present embodiment. Since S801 through S805 are the same as the processes of S401 through 405, the explanations thereof are omitted.

In S806, the background luminance value obtaining unit 304 obtains, from the background generating unit 302, data of the pixels in the area of a background image corresponding to the filter area of a target pixel. Of the obtained data, the background luminance value obtaining unit 304 transmits, to the minimum value determining unit 701, the luminance value of the pixel in the background image corresponding to the target pixel. In addition, the luminance value of each pixel in the area of the background image corresponding to the filter area of the target pixel is transmitted to the luminance difference determining unit 703.

In S807, the input luminance value obtaining unit 303 obtains the input image data and obtains data of the target pixel in the input image and each pixel constituting the filter area of the target pixel. Of the obtained data, the input luminance value obtaining unit 303 transmits the luminance value of the target pixel in the input image to the minimum value determining unit 701. In addition, the input luminance value obtaining unit 303 transmits the luminance value of each pixel constituting the filter area of the target pixel to the luminance difference determining unit 703.

In S808, the minimum value determining unit 701 obtains each of the luminance value of the target pixel in the input image, which is transmitted in S807, and the luminance value of the pixel in the background image corresponding to the target pixel, which is transmitted in S806. The minimum value determining unit 701 determines the smaller one of the luminance value of the target pixel in the input image and the luminance value of the pixel in the background image corresponding to the target pixel as the first feature amount of the target pixel.

As described later, also in the present embodiment, the two-dimensional table for determining a threshold value is set such that the threshold value increases as the first feature amount increases and the threshold value decreases as the first feature amount decreases.

In the present embodiment, the smaller one of the luminance value of the input image and the luminance value of the background image is used as the first feature amount. Therefore, there is a case in which the threshold can be made smaller, compared to the first embodiment in which the first feature amount is calculated based on a luminance value of either an input image or a background image. That is, in a case where the luminance value of the input image is smaller than that of the background image, the threshold value is determined based on the luminance value of the input image. In that case, the threshold value can be made smaller, compared to the threshold value determined based on the luminance value of the background image by the method of the first embodiment.

Generally, as shown in the graph of FIG. 6A, in a case where luminance values of an image are small, luminance difference between a foreground and the background of the image tend to be small. According to the present embodiment, in a case where the luminance value of a foreground of an input image is small, the threshold value for determining a target pixel as a pixel in the foreground area is also determined to be small. Therefore, it is possible to determine the target pixel as a pixel for constituting the foreground area.

In S809, the luminance difference determining unit 703 calculates a luminance difference for each pixel, regarding each pixel in the filter area of the input image, which is transmitted in S807, and each pixel in the area of the background image corresponding to the filter area, which is transmitted in S806.

In S810, the luminance difference variance determining unit 702 calculates a variance value, which represents distribution of luminance difference of the pixels constituting the filter area, based on the luminance difference of the respective pixels in the filter area calculated in S809. The luminance difference variance determining unit 702 determines the calculated variance value as the second feature amount of the target pixel. Note that the second feature amount is not limited to a variance value as long as the second feature amount is a value representing distribution of luminance difference in the filter area. For example, the standard deviation of luminance difference in the filter area may be calculated and used as the second feature amount.

In S811, the threshold value determining unit 306 obtains the first feature amount (the smaller one of the luminance values of the background image and the input image) determined in S808 and the second feature amount (the variance value) calculated in S810. The threshold value determining unit 306 determines a threshold value for determining whether the target pixel is a pixel constituting the foreground area, according to the obtained first feature amount and second feature amount.

The threshold value is determined in the same manner as in the first embodiment. That is, the threshold value is determined based on values of the two-dimensional table set with first feature amounts as one axis and second feature amounts as the other axis. The threshold value is set in the two-dimensional table such that the threshold value increases as the first feature amount increases. The degree of change of the threshold value corresponding to the first feature amount is set in advance according to the gamma characteristic, or the like, of the background image or the input image. Further, the threshold value in the two-dimensional table is set such that the threshold value increases as the second feature amount, which is a variance value, increases.

A luminance difference in the blur area generated at the boundary part between the foreground and the background gradually increases as getting closer to the foreground, as illustrated in the graph of FIG. 6B. Therefore, in the filter area including the blur area, the spread of distribution of luminance difference increases, so that the variance value increases. That is, in a case where the variance value of the filter area is large, there is high possibility that the target pixel is a pixel constituting the blur area. For this reason, the two-dimensional table for determining the threshold value is set such that the threshold value increases as the second feature amount increases. Thus, since it is possible to prevent the blur area from being determined as the foreground area, it is possible to inhibit the foreground area from becoming enlarged as illustrated in FIG. 1D and improve the accuracy of the foreground area.

In addition, as the second feature amount, the average value, the maximum value, and the minimum value of the luminance differences of the pixels in the filter area may be calculated, so as to calculate the second feature amount based on the average value, the maximum value, and the minimum value. For example, the intermediate value between the average value and the maximum value or the intermediate value between the average value and the minimum value may be used as the second feature amount. By setting such that the threshold value increases as the intermediate value increases, it is possible to obtain the same effect as in the case where the variance is set as the second feature amount.

Since the processes of S812 to S813 is the same as the processes of S411 to S412, the explanations thereof are omitted.

As explained above, in the present embodiment, the smaller one of luminance values of a background image and an input image is determined as the first feature amount. In a case where the first feature amount is small, the threshold value becomes small. Therefore, since it is possible to determine a pixel which has a small luminance difference in a foreground of an input image as a pixel of the foreground area, it is possible to inhibit a defect of the foreground area.

On the other hand, in the present embodiment, a variance value of luminance difference of the filter area is determined as the second feature amount. Therefore, even though the first feature amount is small, in a case where the second feature amount is large, the threshold value is adjusted to be larger, compared to a threshold value determined only by the first feature amount. Therefore, in a case of determining whether a pixel constituting a blur area having a large variance value is a pixel constituting a foreground area, it is possible to inhibit the blur area from being determined as the foreground area.

Therefore, according to the present embodiment, for segmenting a foreground area from an input image, it is possible to generate the foreground area such that a defect of the foreground area is inhibited and enlargement of the foreground area is inhibited as well.

Other Embodiments

In the above-described embodiments, a system for generating a virtual viewpoint image by arranging multiple cameras around a stadium has been explained as an example. However, there is no limitation in terms of relative and geometric installation conditions of multiple camera. That is, there may be a mode of performing determination processing of a foreground area based on image data of an image captured by a single camera. Therefore, for example, the embodiments may be implemented by use of such a system in which the image processing apparatus 300 obtains image data from a monitoring camera installed at an indoor or outdoor location or in a remote place so as to determine a foreground area.

The above-described embodiments are the modes in which one image processing apparatus 300 obtains image data of multiple cameras and generates a foreground area of an input image of each camera. Not limited to the embodiments described above, there may be a mode in which hardware (not illustrated) of each camera has the functions except for the function of the virtual viewpoint image generating unit of the image processing apparatus 300. For example, there may be a mode in which hardware of each camera generates a foreground area from a captured image captured by each camera and transmits the generated foreground area to another device that generates a virtual viewpoint image.

Regarding the first feature amount and the second feature amount explained in the above-described embodiments, the threshold value may be determined by exchanging combinations of feature amounts for determining the threshold value. For example, the threshold value may be determined by use of the first feature amount in the first embodiment as the first feature amount and by use of the second feature amount in the second embodiment as the second feature amount. Alternatively, the threshold value may be determined by use of the first feature amount in the second embodiment as the first feature amount and by use of the second feature amount in the first embodiment as the second feature amount.

Further, in the above-described embodiments, two feature amounts are used for determining the threshold value. However, the threshold value may be determined based on multiple feature amounts, which may be two or more. For example, there may be a mode in which the threshold value is determined based on four feature amounts by use of the first feature amounts and the second feature amounts of the first embodiment and the second embodiment, respectively.

In the above-described embodiments, a luminance value, a luminance difference, or the like, is used as a feature amount for determining the threshold value. However, the feature amount is not limited to the above examples. The feature amounts may be anything as long as each feature amount is obtained with different criteria, based on information about a pixel included in a filter area of an input image and a pixel in an area of a background image corresponding to the filter area. For example, there may be a mode in which a feature amount is calculated based on pixel information such as saturation, hue, and brightness of an input image or a background image, so that a threshold value is determined based on the feature amount.

In the above-described embodiments, one threshold value is provided as the threshold value for determining whether a target pixel is in a foreground area, and, in a case where the luminance difference of the target pixel is larger than the threshold value, the target pixel is determined as a pixel constituting the foreground area. The threshold value is not limited to one. For example, there may be a mode in which two threshold values (upper limit threshold value and lower limit threshold value) are determined, and, in a case where the luminance value of the target pixel is within the range of the two threshold values, the target pixel is determined to be in the foreground area.

In the above-described embodiments, each feature amount is determined based on calculation by the feature amount determining unit 305. However, each feature amount may be determined by obtaining the feature amount.

The above-described embodiments may be provided in an implementation form such as a system, an apparatus, a method, a program, a recording medium (storage medium), or the like. Specifically, the embodiments may be applied to a system configured with multiple devices (for example, a host computer, an interface device, an image capturing device, a web application, etc.) or may be applied to an apparatus composed of a single device.

The above-described embodiments can also be implemented by supplying a recording medium (or storage medium) that records a program code (a computer program) of software that implements the functions of the embodiments to a system or an apparatus. The storage medium is a computer-readable storage medium, and a computer (or a CPU, an MPU, etc.) of the system or apparatus reads out the program code stored in the recording medium and executes processing. In this case, the program code itself which is read out from the recording medium implements the functions of the above-described embodiments. Further, the recording medium on which the program code is recorded constitutes the present disclosure.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-221346, filed Nov. 27, 2018, which is hereby incorporated by reference wherein in its entirety.

What is claimed is:

1. An image processing apparatus comprising:
one or more memories storing instructions; and
one or more processors configured to execute the instructions to:
obtain a captured image captured by an image capturing device;
obtain a background image corresponding to the obtained captured image;
specify a first value related to a luminance of the obtained captured image or of the obtained background image;
specify a second value related to a luminance difference between the obtained captured image and the obtained background image; and
generate an image indicating a foreground area of the obtained captured image based on the specified second value related to the luminance difference and a threshold value, the threshold value being set according to both of (i) the specified second value related to the luminance difference and (ii) the specified first value related to the luminance.

2. The image processing apparatus according to claim 1, wherein the one or more processors are configured to execute the instructions further to determine the threshold value based on the specified first value related to the luminance and the specified second value related to the luminance difference by using a two-dimensional table.

3. The image processing apparatus according to claim 2, wherein a value related to luminance of a pixel of the captured image or of the background image is specified, and
wherein a value related to a luminance difference between pixels corresponding to each other in the captured image and the background image is specified.

4. The image processing apparatus according to claim 3, wherein a threshold value for a target pixel in the captured image is determined based on the specified value related to the luminance of the pixel of the captured image or of the background image and based on the specified value related to the luminance difference between pixels corresponding to each other in the captured image and the background image,
wherein whether the target pixel is a pixel constituting the foreground area is determined based on a value related to the luminance difference between a pixel of the captured image corresponding to the target pixel and a pixel of the background image corresponding to the target pixel and the determined threshold value for the target pixel, and
wherein the image indicating the foreground area is generated based on a result of the determination.

5. The image processing apparatus according to claim 4, wherein the target pixel is determined as a pixel constituting the foreground area in a case where the value related to the luminance difference between the pixel of the captured image corresponding to the target pixel and the pixel of the background image corresponding to the target pixel is larger than the determined threshold value for the target pixel.

6. The image processing apparatus according to claim 4, wherein the threshold value for the target pixel is determined based on the smaller one of the value related to the luminance of the target pixel in the captured image and the value related to the luminance of the pixel of the background image corresponding to the target pixel.

7. The image processing apparatus according to claim 4, wherein the threshold value for the target pixel is determined based on a respective value related to the luminance difference between pixels constituting a first area of the captured image and pixels constituting a second area of the background image, the first area including the target pixel, the second area corresponding to the first area.

8. The image processing apparatus according to claim 7, wherein the threshold value for the target pixel is determined based on the largest value of the respective value related to the luminance difference between the pixels constituting the first area of the captured image and the pixels constituting the second area of the background image, the first area including the target pixel, the second area corresponding to the first area.

9. The image processing apparatus according to claim 7, wherein the threshold value for the target pixel is determined based on a value determined by use of the respective value related to the luminance difference between the pixels constituting the first area of the captured image and the pixels constituting the second area of the background image, the first area including the target pixel, the second area corresponding to the first area, the value being based on distribution of values related to luminance differences in the first area.

10. The image processing apparatus according to claim 7, wherein the threshold value for the target pixel is determined based on a maximum value, an average value, and a minimum value of the respective value related to the luminance difference between the pixels constituting the first area of the captured image and the pixels constituting the second area of the background image, the first area including the target pixel, the second area corresponding to the first area.

11. The image processing apparatus according to claim 1, wherein in a case where the specified first value related to the luminance is a third value, the threshold value is a first threshold value, and in a case where the specified first value related to the luminance is a fourth value that is smaller than the third value, the threshold value is a second threshold value larger than the first threshold value.

12. The image processing apparatus according to claim 1, wherein in a case where the specified second value related to the luminance difference is a fifth value, the threshold value is a third threshold value, and in a case where the specified second value related to the luminance difference is a sixth value that is smaller than the fifth value, the threshold value is a fourth threshold value larger than the third threshold value.

13. The image processing apparatus according to claim 1, wherein the threshold value becomes larger as the specified second value related to the luminance difference becomes larger, and the threshold value becomes larger as the specified first value related to the luminance becomes larger.

14. The image processing apparatus according to claim 1, wherein the specified second value related to the luminance difference and the specified first value related to the luminance are variables for determining the threshold value.

15. The image processing apparatus according to claim 1, wherein a plurality of images captured by a plurality of image capturing devices are obtained, and
wherein the one or more processors are configured to execute the instructions further to generate a virtual viewpoint image based on the obtained plurality of images and the image indicating the generated foreground area, the image being generated for each of the plurality of images.

16. An image processing method, comprising:
obtaining a captured image captured by an image capturing device;
obtaining a background image corresponding to the captured image;
specifying a first value related to a luminance of the obtained captured image or of the obtained background image;
specifying a second value related to a luminance difference between the obtained captured image and the obtained background image; and
generating an image indicating a foreground area of the obtained captured image based on the specified second value related to the luminance difference and a threshold value, the threshold value being set according to both of (i) the specified second value related to the luminance difference and (ii) the specified first value related to the luminance.

17. A non-transitory computer readable storage medium storing a program which causes a computer to perform an image processing method, the image processing method comprising the steps of:
obtaining a captured image captured by an image capturing device;
obtaining a background image corresponding to the captured image;
specifying a first value related to a luminance of the obtained captured image or of the obtained background image;
specifying a second value related to a luminance difference between the obtained captured image and the obtained background image; and
generating an image indicating a foreground area of the obtained captured image based on the specified second value related to the luminance difference and a threshold value, the threshold value being set according to both of (i) the specified second value related to the luminance difference and (ii) the specified first value related to the luminance.

* * * * *